United States Patent [19]

Pohl

[11] 4,124,125
[45] Nov. 7, 1978

[54] ADVANCING APPARATUS FOR SPINE FIN TUBING

[75] Inventor: Walter J. Pohl, Anchorage, Ky.

[73] Assignee: General Electric Company, Louisville, Ky.

[21] Appl. No.: 825,611

[22] Filed: Aug. 18, 1977

[51] Int. Cl.² ............................................. B23Q 5/50
[52] U.S. Cl. ................................... 214/1 BB; 83/278; 83/282; 198/750; 198/772; 214/1 P; 214/1.5
[58] Field of Search ...................... 214/1 BB, 1 B, 1 P, 214/1.5; 90/21 R; 83/278, 282; 198/750, 772

[56] References Cited

U.S. PATENT DOCUMENTS 3,916,763  11/1975  Maroschak ........................ 83/278 X
4,000,672  1/1977  Sitterer ........................... 83/278 X

*Primary Examiner*—Albert J. Makay
*Assistant Examiner*—George F. Abraham
*Attorney, Agent, or Firm*—Frank P. Giacalone

[57] ABSTRACT

An advancing system for heat exchangers having a helically wound spine fin material on the outer wall of a base tube member. The advancing system includes a member movable between a resetting and advancing stroke. The member has a passageway that is adapted to receive the spine fin heat exchanger. The internal walls of the passageway being designed and dimensioned to cause the spine fin tubing to move during the advancing stroke while allowing the tube to remain stationary during the resetting stroke.

7 Claims, 6 Drawing Figures

ADVANCING APPARATUS FOR SPINE FIN TUBING

BACKGROUND OF THE INVENTION

1. Field of the Invention

This invention relates generally to the provision of an apparatus for feeding or advancing predetermined increments of spine fin heat exchanger tubing during the manufacture of a serpentine heat exchanger. More particularly, the invention relates to an advancing system wherein a body member having a passageway for coaxially receiving the heat exchanger is reciprocated between an advancing stroke and a resetting stroke. The passageway is dimensioned to provide engagement between the distal ends of the fin members and the passageway wall, that is sufficient to cause the heat exchanger tubing to be fed axially the predetermined increment during the advancing stroke while allowing the body member to travel through the resetting stroke during which time the heat exchanger is held against axial movement.

2. Description of the Prior Art

In the manufacture of serpentine heat exchangers the machines include a feed mechanism that advances tubing in preselected increments to a bending head which successively bends each increment in alternate directions. In some instances a mandrel occupies the inside of the tube to maintain its roundness during the bending operation. In this instance the mandrel may be used to advance the heat exchanger tubing by moving the mandrel the preselected increment or distance. In some instances the serpentine heat exchanger is formed without employing an internal mandrel, and means must be provided for advancing the tube by externally engaging the tube. When the heat exchangers are formed of spine fin tubing such as produced by the machine shown and described in U.S. Pat. No. 3,688,375-Venables, assigned to the General Electric Company, assignee of the present invention, great care must be exercised to prevent the spine fins from being deformed which could result in loss of heat exchange efficiency. A typical machine for forming serpentine spine fin heat exchangers that does not employ an internal mandrel is disclosed in Ser. No. 677,505-Durbin et al., now U.S. Pat. No. 4,048,834 also assigned to the General Electric Company.

SUMMARY OF THE INVENTION

The present invention provides an apparatus for advancing spine fin heat exchanger tubing which includes a spine fin material having elongated fin members arranged substantially perpendicular to the tube and projecting radially outwardly therefrom. The apparatus includes a body member having a passageway for coaxially receiving the spine fin heat exchanger. Reciprocating means associated with the body member is arranged for moving the body member between an advancing and resetting stroke. The passageway has a diameter less than the diameter defined by the distal ends of the fin members so that the fin members are rotated at an angle from perpendicular to the tube as the distal ends of the spine fins move axially in the passageway. The wall of the passageway provides a roughened surface that when engaged by the distal ends of the angled fin members during the advancing stroke is sufficient to cause the spine fin heat exchanger to advance.

There is also provided in the apparatus means for holding the heat exchanger during the resetting stroke of the body member so that the spine fin heat exchanger is moved axially only during the advancing stroke.

DETAILED DESCRIPTION OF THE INVENTION

Figure 1:
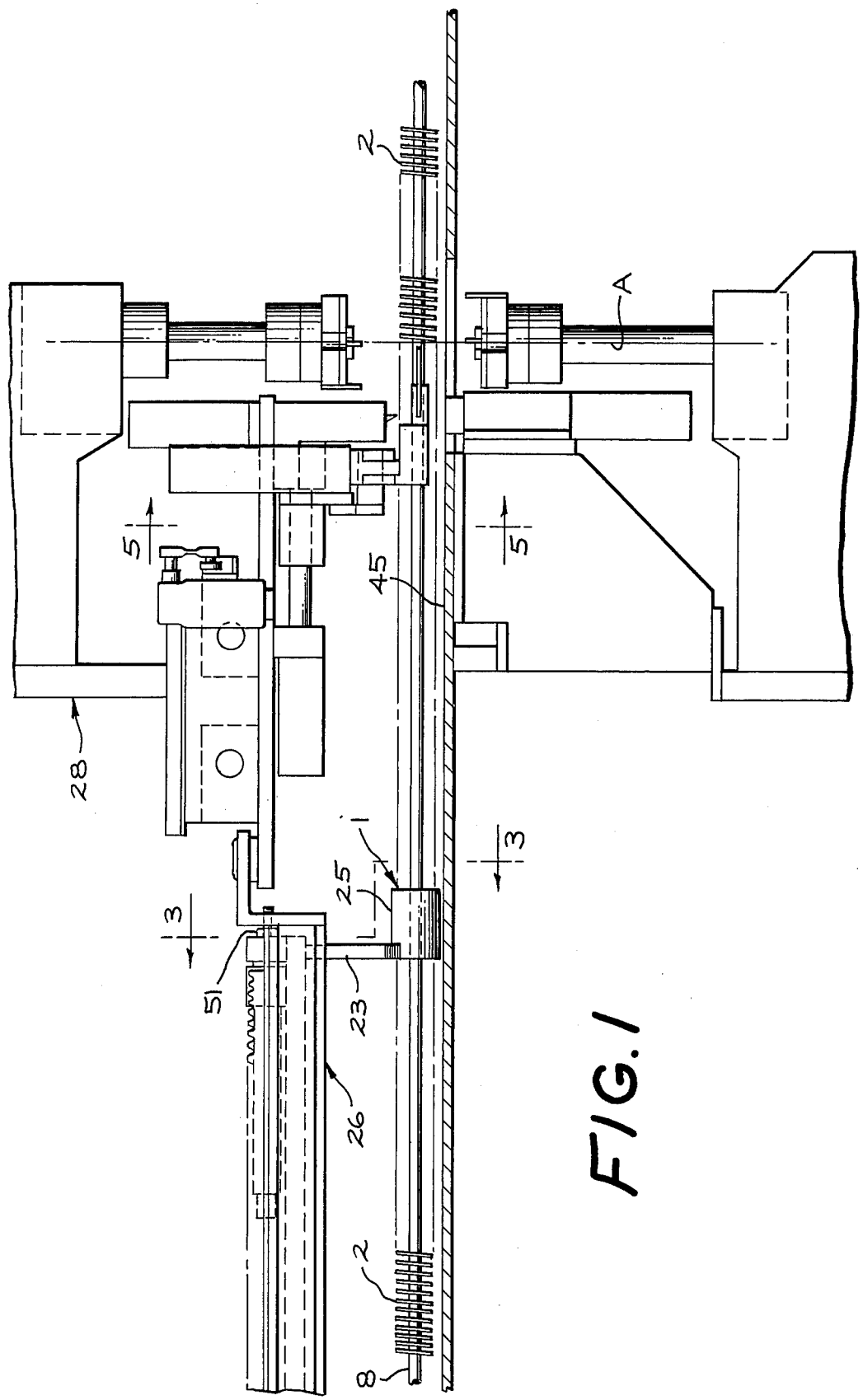
FIG. 1 is an elevational view of a heat exchanger forming machine embodying the invention.
Figure 2:
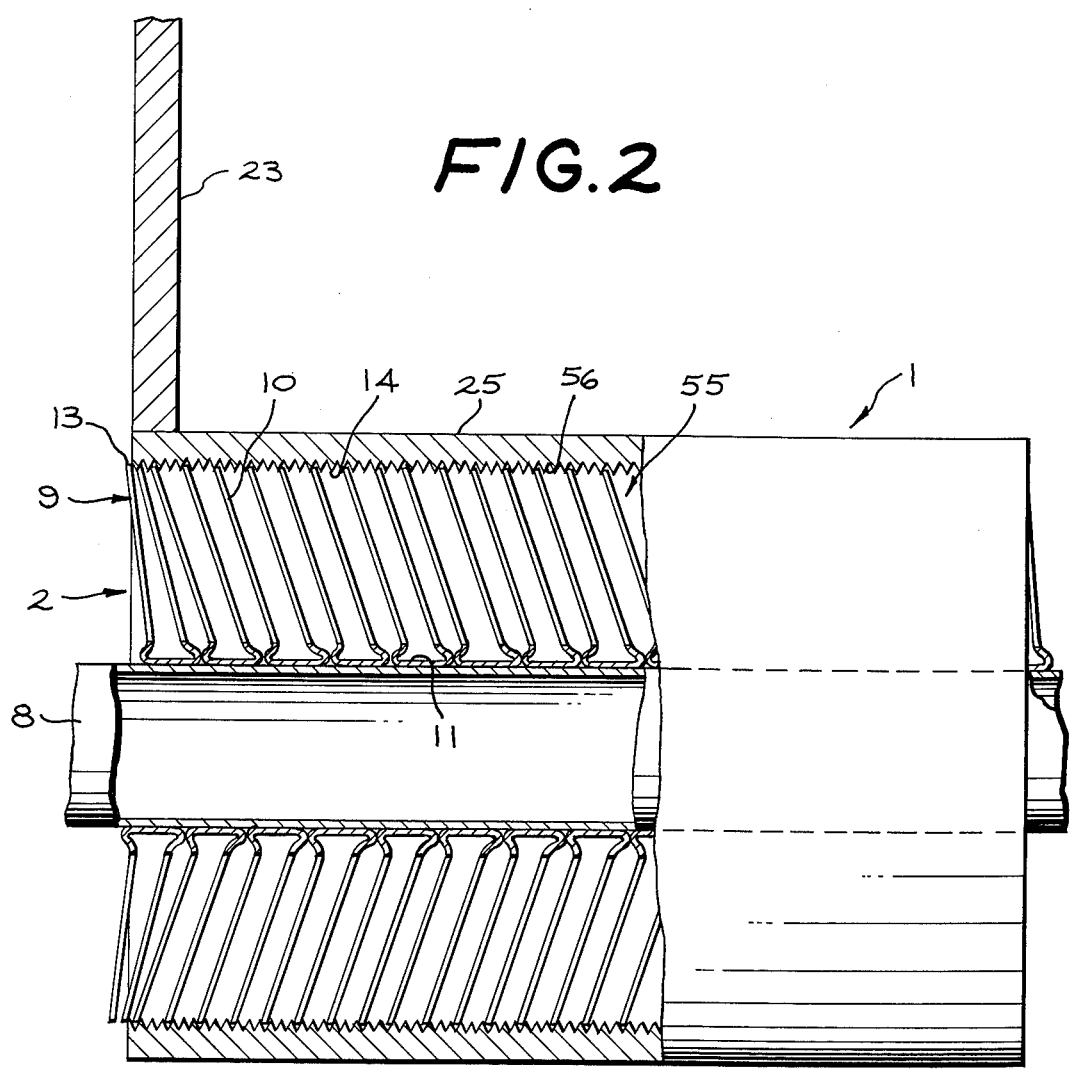
FIG. 2 is a side elevational view in section showing the details of the advancing system of the present invention.

Referring to the drawings, and more particularly to FIGS. 1-2, the spine fin tube advancing apparatus 1 of the present invention is shown in combination with the machine for forming serpentine heat exchangers disclosed in pending patent application Ser. No. 677,505—Durbin et al, assigned to General Electric Company, assignee of the present invention. However, it should be understood that the present invention can be used in conjunction with any machine or process that requires feeding spine fin heat exchanger tubing in increments.

The spine fin heat exchanger 2 advanced by the apparatus of the present invention is similar to one procedure by the machine disclosed in Patent 3,688,375-Venables, referred to hereinbefore.

Figure 3:
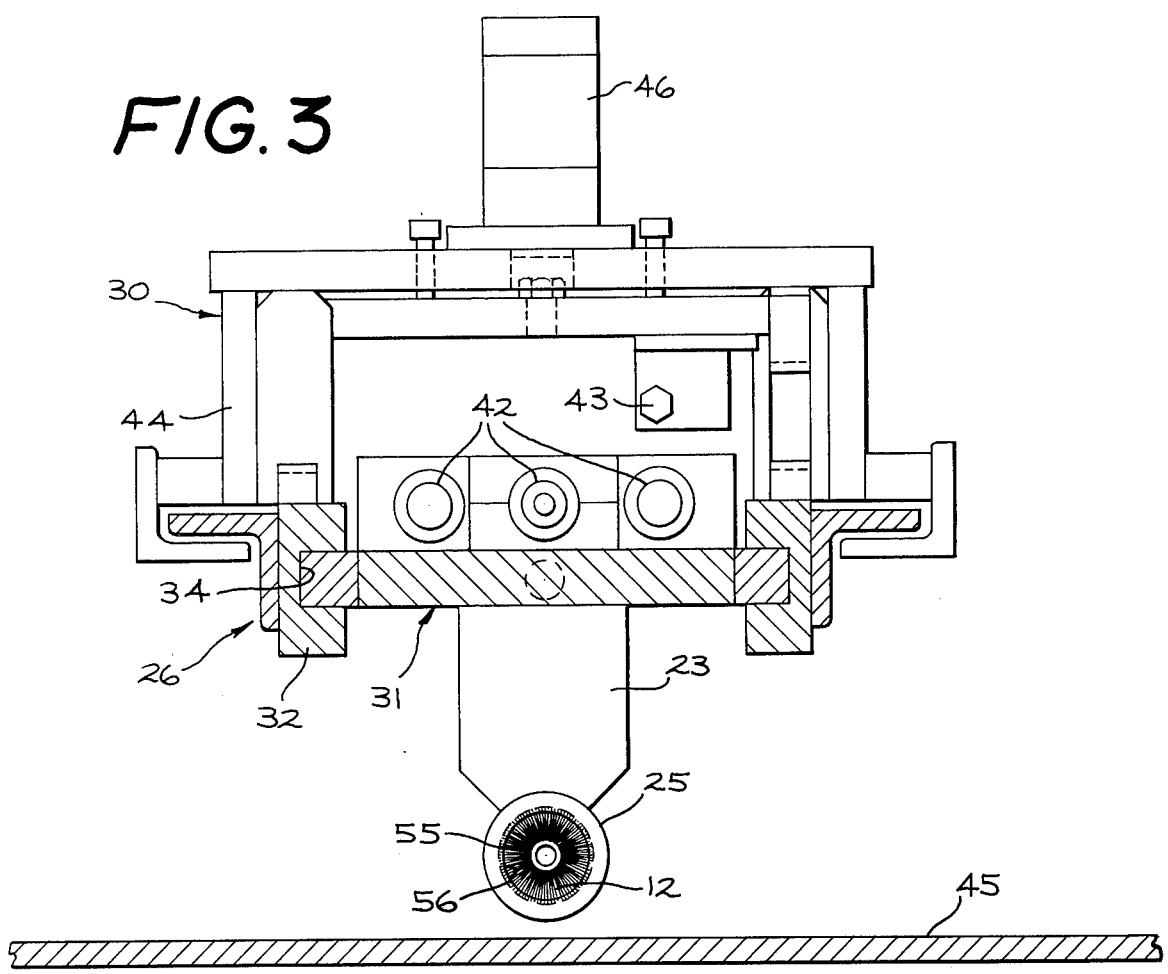
FIG. 3 is an enlarged sectional view taken along line 3—3 of FIG. 1.
Figure 5:
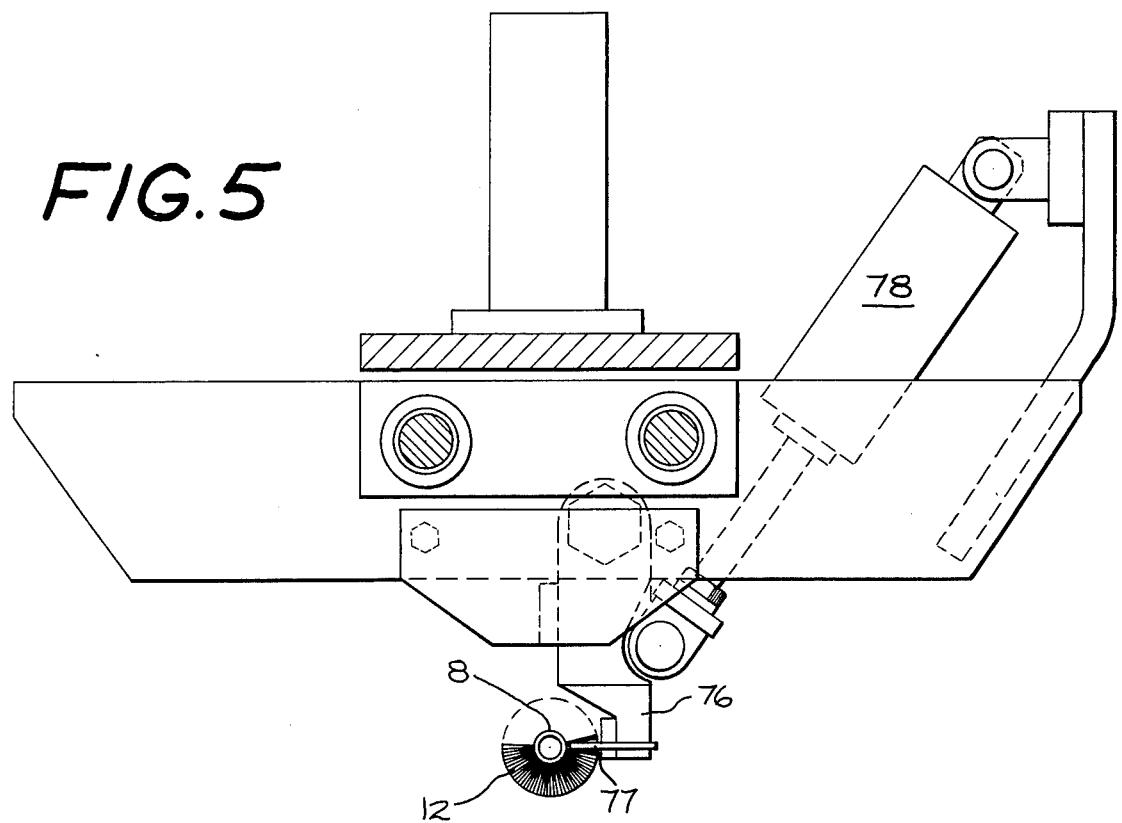
FIG. 5 is an enlarged elevational view taken along line 5—5 of FIG. 1.

Referring now to FIGS. 1 and 2 of the drawing, it will be seen that the primary surface of the spine fin heat exchanger 2 is provided with a tube 8 carrying the cooling medium or refrigerant and a secondary or extended surface provided by a strip or spine fin material 9 wound helically about the tube and having radiating fin portions 10 projecting therefrom. The secondary radiating member or spine fin material 9 includes a base strip 11 with the fin portion 10 being an integral extension thereof. The fin portion 10 as shown in the present instance extends from both edges of the base strip 11 and is bent up at substantially right angles thereto, and is slit to provide a plurality of slender radiating fins 12 (FIGS. 3 and 5).

Figure 4:
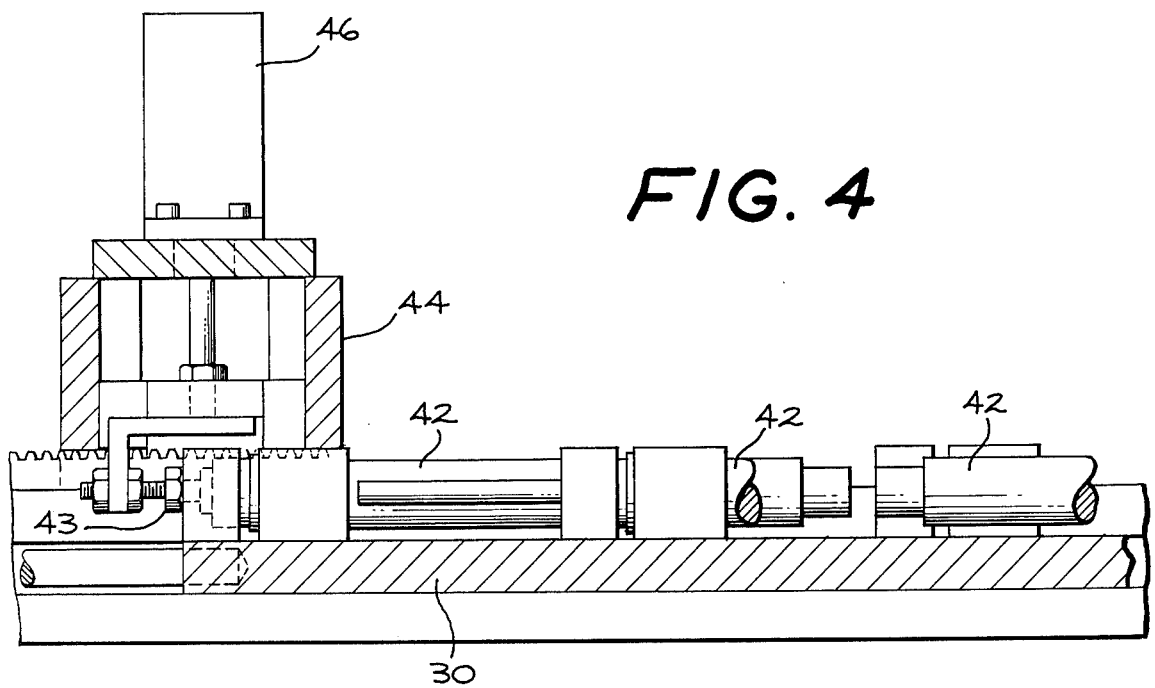
FIG. 4 is an enlarged elevational view of the advancing mechanism of the heat exchanger forming machine.

The present invention is shown in use with the reciprocating advancing mechanism of the above-mentioned machine disclosed in Durbin et al. which will now be described briefly. Referring to FIGS. 1, 3 & 4 of the drawings, an advancing mechanism 26 arranged in a support structure or frame 28 of the machine is effective in advancing the tube 2 in preselected increments relative to a central axis A, around which return bends are made in forming a serpentine heat exchanger. The heat exchanger 2 is received in a tubular body member 25 forming a part of the present advancing apparatus and will be described in detail hereinafter. The member 25 is supported on a bracket 23 forming a part of the advancing mechanism 26. The advancing mechanism 26 includes guide means or slide frame 30 (FIG. 3) and a tube advancing portion or plate 31 which is arranged for reciprocating longitudinal movement on frame 30 between an advancing stroke and a retracting or resetting stroke. The frame 30 includes parallel spaced guide rails 32 (FIG. 3) which include recesses or tracks 34 for slidably receiving the plate 31.

Mounted on the upper surface of plate 31 (FIGS. 3 and 4) is a series of dampers 42 arranged to engage stop members 43 which are selectively mounted on the stationary frame 30 relative to the central axis. Referring to FIG. 4, it will be seen that the stop members 43 are arranged for vertical travel on a support structure 44 which is adjustably mounted on the frame 30. In operation a selected stop 43 is moved by an operating member 46 into the path of a cooperating damper 42 to control and index the tube advancing portion 31 in its retracted or resetting position relative to the central axis A. The cooperating dampers 42 and stops 43 are arranged axially relative to longitudinal travel of the tube 1 to provide preselected increments of travel of the tube advancing portion 31.

The retracted position of the advancing portion 31 relative to the central axis, and the length of the tube increment to be advanced, is determined by the position of the stop members 43 on the frame 30. It should be noted that a selectively located stop 43 must be provided for each desired increment of heat exchanger tube movement to engage a cooperating damper 42.

Means are provided to move the reciprocating or advancing portion 31 longitudinally relative to the frame 30. To this end, an actuating ram or member (not shown) is energized to move the portion 31 including body member 25 through a resetting stroke to the retracted position against a preselected stop 43 as shown in FIG. 4, and through an advancing stroke to the advanced position as shown in FIG. 1 against a fixed stop 51 secured to frame 30. In this position the selected increment of tubing has been moved to an advanced position relative to central axis A.

By the present invention means are provided for effectively moving the spine fin heat exchanger axially toward the central axis A during the advance stroke portion of the advancing mechanism by firmly engaging the spine fin members 10. Accordingly, the following description will fully describe a preferred embodiment of the invention.

Referring now to FIGS. 2 and 3, it will be seen that the body member 25 includes a passageway 55 extending longitudinally therethrough, with the spine fin heat exchanger 2 being received coaxially in the passageway 55. The diameter of the passageway 55 is less than the diameter of the spine fin heat exchanger 2 as defined by the distal ends 13 of the spine fins 12. Accordingly, as the heat exchanger 2 passes through the passageway 55, as when the heat exchanger is initially positioned in the machine or during the resetting stroke, the distal ends 13 of spine fins 12 engage the wall 56 of passageway 55 causing the fins 12 to be deflected and to rotate or angle as shown rearwardly away from the central axis A and their substantially right angle position relative to the plane defined by the wall of tube 8.

In effect, the engagement of distal end 13 of the deflected or angled spine fins 12 causes them to become wedged between the wall 56 of passageway 55 and their terminal end at the base portion 11. As the body member 25 moves in the advancing direction, toward the central axis A, the engagement of the distal ends 13 of spine fin members 12 with the wall 56 results in a positive wedging action that is sufficient to carry the spine fin heat exchanger 2 forward with it and cause an increment of tubing to be fed relative to the central axis A. In the present embodiment, the proper positive wedging action sufficient to cause the spine fin heat exchanger 2 to move with body member 25 was obtained when the diameter of the spine fin heat exchanger 2 at the distal ends 13 was between 1.275 and 1.285 and the diameter of the passageway wall 56 was between 1.230 and 1.240 inches. The longitudinal length of the body member 25 was approximately 3 inches.

It should be understood that it is not necessary for the spine fin portion 10 to be substantially perpendicular to the base 11 as indicated in FIG. 2 prior to passing through the passageway 55. It is necessary, however, that the diameter at the distal ends 13 of the fin portion 10 be greater than the diameter of the passageway 55. It is this difference in diameters that causes the fin portion 10 to be deflected rearwardly relative to the central axis A, and also ensures positive contact between the distal ends 13 and the passageway wall 56.

While the above-mentioned dimension caused a wedging action of the fins 12 between the wall 56 and base 11 that effectively caused forward feeding of the heat exchanger tubing 2 during the advancing stroke, it should be noted that any slippage between the distal ends 13 and wall 56 during the advancing stroke will result in the increment being fed to be less than the predetermined amount. To this end means are provided by the present invention to further ensure that the positive engagement between the distal ends 13 of fins 12 and the wall 56 is sufficient to move or advance heat exchanger 1 the precise increment desired.

To this end the wall 56 is roughened to provide irregularities in the surface thereof that are engaged by the distal ends 13 of the fins 12. In the present embodiment the desired roughness of the surface of wall 56 was provided by employing pipe threads 14 of between 6 to 60 T.P.I. This arrangement as employed causes the distal ends 13 of the spine fin 12 to ratchet across the pitch of the threads 14 when the heat exchanger is initially positioned in the machine and during the resetting stroke as the fins 12 enter the passageway 55 and to make positive contact with the groove portion of the threads 14, as shown in FIG. 2, as the member 25 is advanced toward the central axis A.

While standard 10 to 200 T.P.I. threads 14 were successfully employed it should be noted that other means may be employed on the wall 56 that would provide sufficient gripping action between the distal ends 13 and wall 56 to cause accurate movement and advancement of spine fin heat exchanger 2. This necessary roughing of wall 56 may be provided in any number of ways such as individual circumferential grooves or by providing a granular sandpaper-type surface. The exact configuration of the roughened surface of wall 56 is not critical; however, it is critical that movement of the distal ends 13 and heat exchanger 2 relative to the wall 56 be prevented and that the engagement of the distal end 13 with the roughened wall is sufficient during the advancing stroke to cause accurate forward advancement of heat exchanger 2.

Means are provided for holding the heat exchanger 2 in its advanced position during the resetting or retracting stroke so that the heat exchanger 2 is not reciprocated and moved rearwardly with the body member 25 when the advancing mechanism 26 resets while effectively allowing axial forward movement of the heat exchanger 2 with the body member 25 during the advancing stroke.

To this end in one embodiment as shown in FIGS. 1 and 5 and used in conjunction with the Durbin et al machine, there is provided a holding means including a movable member 76 having a gripping blade 77 that engages the heat exchanger 2. The member 76 and blade 77 are pivoted into engagement with the heat exchanger 2 by an actuator 78 before the start of the resetting stroke and maintain the blade 77 in contact with heat exchanger 2 during the entire resetting stroke to prevent rearward movement of the heat exchanger 2 as the passageway wall 56 of member 25 moves across the distal ends 13 of fins 12 until the advancing mechanism 26 engages its selected stop 43. The actuator 78 then pivots member 76 and blade 77 out of engagement with the heat exchanger 2 before the start of the advancing stroke to allow axial forward movement of the heat exchanger 2 with member 25.

Figure 6:
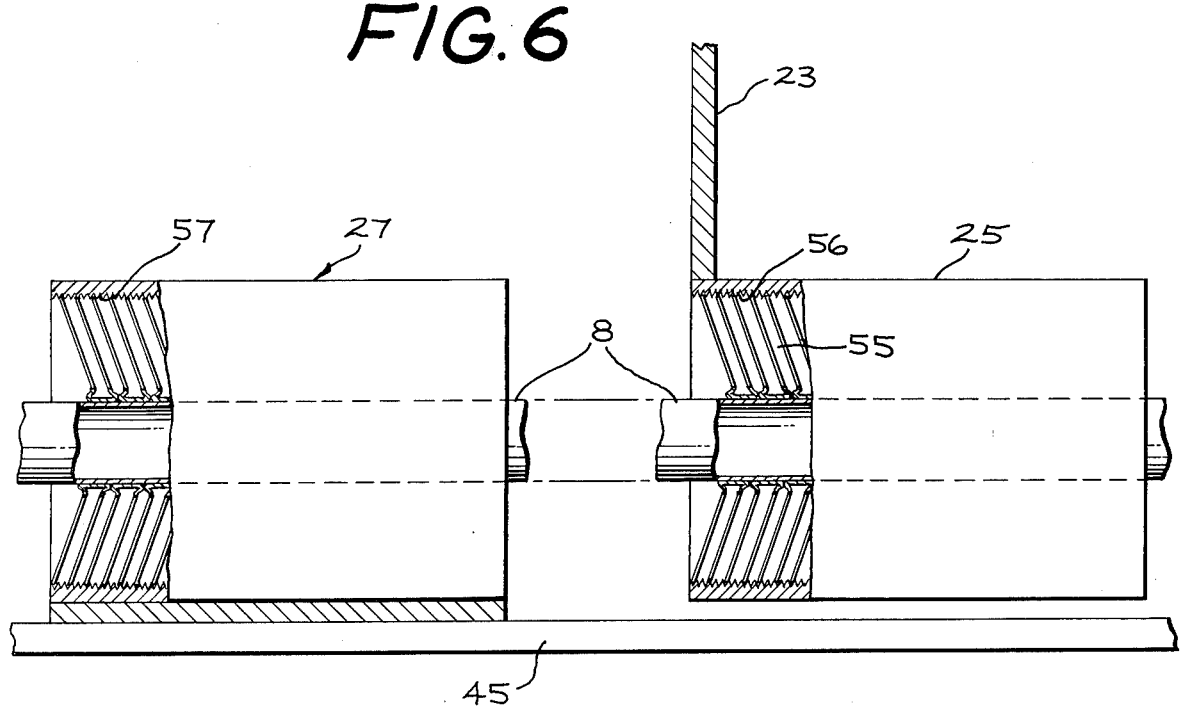
FIG. 6 is an enlarged elevational view showing a second embodiment.

It should also be noted that in another embodiment (FIG. 6) of the invention the holding means employed during the resetting stroke is a second body member similar to 25 employed for advancing the tube 2. As shown in FIG. 6, a second body member indicated as 27 including a passageway 57 is secured to a support table 45 so as to be stationary relative to the moving or reciprocating body member 25.

Accordingly, the spine fins 12 are rotated or deflected rearwardly from their substantially perpendicular position relative to tube 8 as they travel or pass through the first body member 27 prior to reaching the reciprocating advancing body member 25. In this arrangement, the deflected or angled spine fins 12 in passageway 57 of body member 27 wedge to prevent rearward movement of the spine fin heat exchanger axially away from the central axis A during the resetting stroke of body member 25. During the resetting stroke with the spine fin heat exchanger 2 held against movement by member 27, the body member 25 moves across the angled fin member 12 in passageway 55 toward member 27 to its retracted position. During the advancing stroke of body member 25, the angled or wedged spine fins 12 in body member 27 ratchet in passageway 57 in the same manner that the spine fins 12 ratchet in passageway 56 during the resetting stroke of member 25.

The foregoing is a description of the preferred embodiment of the invention and variations may be made thereto without departing from the true spirit and scope of the invention, as defined in the appended claims.

What is claimed is:

1. An apparatus for advancing spine fin heat exchanger tubing including a spine fin material having a base portion and at least one fin portion slit to provide elongated fin members, said base portion being wound helically in close flatwise engagement with said tube surface with said elongated fin members extending radially therefrom, said apparatus comprising:
    a body member having a passageway extending axially therethrough for coaxially receiving said spine fin heat exchanger tubing;
    reciprocating means associated with said body member for moving said body member axially between an advancing stroke and a resetting stroke;
    said passageway having a diameter less than the diameter of said spine fin heat exchanger defined by the distal ends of said fin members, so that the spine fin members are deflected rearwardly as the spine fin heat exchanger moves axially in said passageway relative to said body member;
    means on the wall of said passageway providing a roughened surface that when engaged by said distal ends of said deflected spine fin members is sufficient to cause said heat exchanger to be moved axially with said body member during its advancing stroke; and
    means for holding said spine fin heat exchanger against movement during the resetting stroke of said body member so that the distal ends of the angled fin members move across said roughened surface of said passageway wall and for allowing the engagement of the distal ends of said angled fin members with said roughened wall to move said spine fin heat exchanger axially.

2. The apparatus of claim 1 wherein said holding means includes a member movable into engagement with said spine fin heat exchanger tubing during said resetting stroke to prevent movement of said spine fin heat exchanger relative to said body member.

3. The apparatus of claim 2 wherein said roughened surface consists of circumferentially disposed grooves arranged in a plane perpendicular to the passageway axis.

4. The apparatus of claim 2 wherein said roughened surface consists of standard threads of between 10 and 200 threads per inch.

5. The apparatus of claim 1 wherein said holding means includes a second body member being stationary relative to said reciprocating means, said second body member having an aperture extending axially therethrough being substantially axially aligned with said passageway;
    said aperture having a diameter less than the diameter of said spine fin heat exchanger as defined by the distal ends of said fin members, so that the spine fin members are deflected rearwardly as the spine fin heat exchanger moves through said aperature;
    means on the wall of said aperature providing a roughened surface that when engaged by said distal ends of said deflected spine fin members is sufficient to prevent movement of said spine fin heat exchanger during the resetting stroke.

6. The apparatus of claim 5 wherein said roughened surface consists of circumferentially disposed grooves arranged in a plane perpendicular to the passageway axis.

7. The apparatus of claim 6 wherein said roughened surface consists of standard threads of between 10 and 200 threads per inch.

* * * * *